United States Patent [19]

Wreede et al.

[11] Patent Number: 4,853,306

[45] Date of Patent: Aug. 1, 1989

[54] METHOD AND APPARATUS FOR DEHYDRATING DICHROMATIC GELATIN HOLOGRAMS

[75] Inventors: John E. Wreede, Monrovia; James E. Scott, Culver City, both of Calif.

[73] Assignee: Hughes Aircraft Company, Los Angeles, Calif.

[21] Appl. No.: 99,281

[22] Filed: Sep. 21, 1987

[51] Int. Cl.⁴ .......................... G03H 1/18; G03H 1/04
[52] U.S. Cl. ............................................. 430/1; 430/2; 430/325; 430/331; 430/321; 430/290
[58] Field of Search .................. 430/1, 2, 274, 325, 430/290, 326, 289, 330, 331, 322, 321; 252/194; 350/3.6, 3.61; 355/2; 358/2

[56] References Cited

U.S. PATENT DOCUMENTS

| | | | |
|---|---|---|---|
| 4,025,345 | 5/1977 | Kido et al. | 430/1 |
| 4,029,507 | 6/1977 | Wehner et al. | 430/2 |
| 4,133,600 | 1/1979 | Russell et al. | 350/3.72 |
| 4,367,911 | 1/1983 | Graube | 430/2 |
| 4,510,221 | 4/1985 | Gorin et al. | 430/1 |
| 4,530,564 | 7/1985 | Close | 350/3.69 |

Primary Examiner—José G. Dees
Assistant Examiner—Donald J. Loney
Attorney, Agent, or Firm—Leonard A. Alkov; A. W. Karambelas

[57] ABSTRACT

A method of manufacturing optical elements, such as for head-up displays, from holographically recorded interference patterns in a dichromatic gelatin is disclosed. The exposed hologram pattern is developed through hydration, the hydrated hologram gelatin is dehydrated by contacting the hydrated gelatin with a mixture of isopropyl alcohol and an inert anhydrous fluid, such as a liquid fluorinated hydrocarbon solution. The dehydrated hologram pattern can then be subsequently stabilized, for example, by baking.

19 Claims, 1 Drawing Sheet

4,853,306

METHOD AND APPARATUS FOR DEHYDRATING DICHROMATIC GELATIN HOLOGRAMS

BACKGROUND OF THE INVENTION

1. Field of the Invention

The present invention is directed to an improved production process of manufacturing holograms and more particularly to an improved dehydrating step for manufacturing dichromated gelatin holograms in a safe and expedited manner.

2. Description of the Related Art

The advantages of using holograms for various displays is well known. Commercially, holographic optical elements are being used for numerous purposes such as HUD, Head-Up Displays, head-down displays, laser eye protection visors, helmet-mounted displays, simulator domes and solar concentrators. There is a desire to provide a production capacity to meet the demands for these holographic optical elements.

It has been known to use hardened gelatin films as the medium for the recordation of information by holography. Usually the hardened gelatin film is sensitized to exhibit a light response by contacting it with an appropriate sensitizer solution. The sensitized gelatin film is then exposed in the usual holographic manner and then the gelatin plate is subsequently desensitized and developed to be stabilized for a period of time commensurate with the expected life of the holographic optical element.

An example of a pre-exposure hardened gelatin film can be found in U.S. Pat. No. 3,617,274. Additionally, a discussion of the various types of dichromatic gelatin and procedures for developing the same can be found in "Topics in Applied Physics, Holographic Recording Materials", Volume 20, 1977, edited by H. M. Smith.

The related art has proposed hardening of the gelatin before processing or during the liquid processing development of the holographic images. Most of these processes use a thermal or actinic agent to harden the gelatin via cross-linking with dichromate ions. There have been other attempts to use gelatin hardeners such as aldehydes or commercial fixers with a hardener (a photographic fixer itself has no fixing affect on non-silver halide films). The effect of cross-linking the gelatin is to reduce the efficiency of the hologram. Attempts to restore efficiency by processing at hotter temperatures presents the problem of making the gelatin softer. Consequently, no net gain was obtained.

It is known that the reflection wavelength exhibited by dichromated gelatin reflective holographic optical elements display a logarithmic function of time and temperature. The rate of change with time varies by a factor of about 2.2 for every 10° C. change in temperature. A standard method of achieving thermal stability in the production of a HUD hologram is to bake it for extended times at relatively high temperatures. Approximately a one-month period of baking or stabilizing at 100° C. will insure that the rate of change in a wavelength with time will be so slight that virtually no measurable further change will occur at the operating temperatures during the usable life of a holographic optical element in a HUD.

As noted by T. A. Schenkoff in "Applied Optics", Volume 7, Page 2101 (1968), an optically-induced phase shift of an exposed and developed hardened dichromatic gelatin plate could be increased by changing the development process of the hologram. This article suggested developing the hologram in mildly agitated water at 35° C. for approximately 30 seconds, dipping the gelatin plate in isopropanol for 30 seconds and then air drying with a stream of dry air udder pressure. The gelatin was saturated with water and fully swollen at the time it was immersed in the isopropyl alcohol and the alcohol was used to replace the water in the gelatin. The isopropyl alcohol dried the gelatin layer extremely rapidly because it did not dissolve the gelatin and it did not wet it. It was further observed that the developed hologram could be reimmersed in water and any large index of refraction change would disappear and the hologram efficiency would be returned to a small value. It was noted that the process was reversible if the wet layer was again dried in isopropyl alcohol. Thus, it has been known that a photochemical cross-linking that is produced during the exposure of the dichromated gelatin will remain intact during subsequent steps and that it controls whatever process occurs during the dehydration step. With a hardened gelatin plate, the gelatin molecules are tied together into a continuous three-dimensional network. During swelling and shrinking, this network is basically not changed and so the basic photochemical information recorded in the gelatin layer is not destroyed during development in water and remains in the volume independent of the thickness of the gelatin layer. It has been recognized, however, that the change in the thickness will affect the properties of the hologram and that generally, the thickness of the fully developed emulsion should approximately be equal to that of the gelatin layer during the exposure for minimum aberrations in the diffracted image. Usually, dichromated gelatin utilizes a development procedure which includes a first water-washing step to soften the gelatin for the following drying step. The water-washing step also removes the unreacted dichromate to thereby prevent crystallization and the introduction of scattering centers upon drying.

The washed gelatin plate is usually immersed wet into a water/isopropyl alcohol mixture and a plurality of baths can be utilized with the last bath being as free of water as possible. There have been proposals to control the dissipation of the alcohol from the developed gelatin plate to maintain the hologram efficiency and to discourage any crystallization of the gelatin plate. Brandes et al., "Applied Optics", Volume 8, Page 2346 (1969), disclosed that light scattering and the sensitivity increased with increasing wash-water temperature and decreased when the sensitized gelatin plates had been hardened more extensively. He proposed developing harened gelatin plates in a water-wash at 25° to 40° C. followed by dehydration with isoprop-yl alcohol at 70° C.

Meyerhofer, at Page 90 of "Topics in Applied Physics, Holographic Recording Materials" (1977), proposed preparing a gelatin layer by dip coating with 12 to 18 percent by weight gelatin, from J. T. Baker Chemical Company, USP. Grade, 125 Bloom, suspension in water which was initially mixed at 20° C. with a final stirring at 70° C. and filtering with a heated filter. The mixture was then cooled to 40° C. and $(NH_4)_2 Cr_2O_7$, ammonium dichromate, was added to give a ratio of 0.5 percent to the weight of the gelatin. The glass plate substrate was inserted and withdrawn vertically at a rate of 1 to 5 centimeters per minute. The coated plates were then air dried for 1 hour in a vertical position and then subsequently hardened by baking at 150° C. for 2 hours. The thickness of the gelatin coating on the plate was in the range of 4 um. The films were dried in the dark and stored at 20° C. or lower for more than 12 hours before exposure. After exposure, the plate was washed for approximately 10 minutes in running water at 20° C. The plate was then soaked for 2 minutes in a mixture of 50 percent isopropyl alcohol and 50 percent distilled water with mild agitation. The plate was then removed and the procedure repeated for 2 minutes in a bath of 90 percent isopropyl alcohol and 10 percent water. Finally, the hologram plate was inserted vertically into a fresh isopropyl alcohol bath with agitation for 10 to 20 minutes as the final bath. The plate was pulled out of the bath at a rate of about 1 centimeter per minute while a flow of hot air was directed against the gelatin.

At ordinary room atmosphere conditions, it was found that dichromated gelatin holograms were relatively stable. The use of a combination of water and alcohol bath was believed to be necessary to prevent an excessive rate of dehydration that could create a high-stress condition and cause a milky-white appearance in the gelatin plate which produced heavy light scattering. In mass production, the use of a highly flammable isopropyl alcohol can be dangerous, particularly at elevated temperatures.

The demand for high quality display holographic combiners such as required in the production of head-up displays remain. There is still a demand for improved production processes that can maintain the optical quality while increasing the production yield in a safe environment.

SUMMARY OF THE INVENTION

The present invention is directed to a method of manufacturing optical elements, such as for head-up displays, from holographically recorded interference patterns in a dichromatic gelatin or other similar material. After the hologram pattern has been developed through a hydration step that can comprise a solution of deionized water and triethanolamine solution, a dehydration step is required. The present invention provides a dehydration step that maintains the same efficiency as the prior flammable techniques while improving safety for mass production. In this regard, a bath or a spray of a liquid fluorinated hydrocarbon solution, such as the commercial product, Freon, sold by E. I. Dupont and Company, is utilized. Isopropyl alcohol can be mixed in a ratio of approximately 15 to 80 percent with the fluorinated hydrocarbon solution to form the spray or the bath solution. The dehydrated gelatin can be placed in contact with the solution for from 5 to 20 minutes, and for example, 1 to 4 baths can be utilized depending on the desired results and the desired hologram being developed. The temperature of the bath is usually in the range of 15° C. to approximately 35° C. with a temperature range of approximately 20° C. being utilized. Usually the same temperature is maintained in each of the baths during the dehydration step. The use of a spraying step instead of the series of baths could insure a continual supply of fresh solution to improve uniformity and reduce defects which can further increase the yield of the production. When a bath is utilized for the dehydration step, it is necessary to provide a uniform high agitation to insure that a fresh solution is available to the surface of the gelatin since the fluorinated hydrocarbon does not contribute to the hologram dehydration. Thus, the procedure of removing the water from the gelatin and insuring that a uniform dissipation of the water occurs to improve uniformity in the developed gelatin thickness is important.

As a result of this improvement in the dehydration step, it is possible to eliminate the large volume of flammable alcohol that has been required in the prior art while providing simplicity in utilizing relatively identical baths as opposed to the different alcoholic concentrations that were used in the prior art while insuring both re-producibility and uniform dehydration rates.

The novel features that are considered characteristic of this invention are set forth with particularity in the appended claims. The invention itself, both as to its organization and method of operation as well as additional objects and advantages thereof, will best be understood from the following description when read in connection with the accompanying drawing in which like reference numbers refer to like parts.

DETAILED DESCRIPTION OF THE PREFERRED EMBODIMENTS

Figure 1:
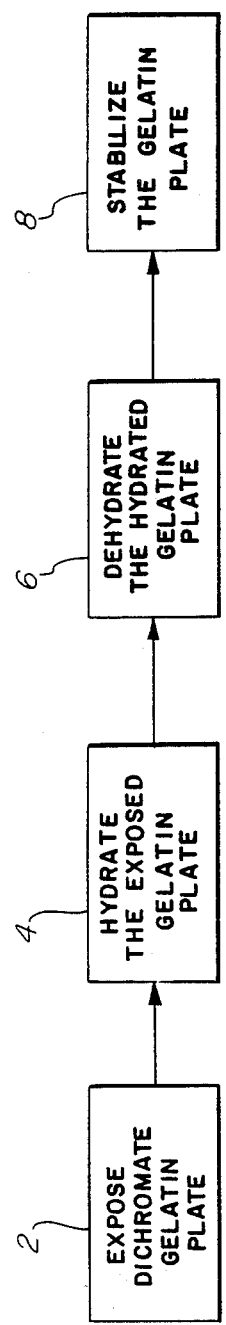
FIG. 1 is a schematic flow chart showing the process steps relevant to the present invention.

The following description is provided to enable any person skilled in the holographic field to make and use the invention and sets forth the best modes contemplated by the inventors for carrying out their invention. Various modifications, however, will remain readily apparent to those skilled in the art, since the generic principles of the present invention have been defined herein specifically to provide an improved safe production process for manufacturing high-quality holographic optical elements from dichromatic gelatin plates and similar material.

As is well known, gelatin is a natural protein collagen which can be obtained from animal sources. The collagen molecules can be broken into regularly shaped polypeptide chains of amino acids which constitute the gelatin. As can be appreciated, because of the natural origin of the basic gelatin material, the chemical composition and structure of the gelatin can vary from one sample to another and accordingly, the process steps defined herein can be varied within the broad generic teaching to accommodate those variations which are known to the prior art. It has also been known to sensitize the gelatin material to form a photosensitive layer with, for example, ammonium, sodium and potassium chromates and dichromates. In the preferred embodiment disclosed herein, ammonium dichromate in gelatin is utilized due to the high solubility of $(NH_4)_2 Cr_2O_7$ in water. This feature permits a high concentration of ammonium dichromate to be dispersed into the colloid without crystallization taking place during the drying of the coating.

For HUD combiner production, the dichromated gelatin can be cast or molded onto a substrate with a diameter of about 15 inches and a thickness of about 20 microns. A typical thickness for holograms in general will be from about 5 microns to 100 microns for the present procedure.

The known art is aware that gelatin has a practical advantage in that it can absorb large quantities of liquids and that the liquids can penetrate it rapidly, thus facilitating subsequent processing steps. The gelatin can also be hardened to various degrees by chemical cross-linking to change its mechanical properties and when it is well-hardened, it remains relatively insoluble to high temperatures. When the gelatin has been sensitized with dichromate ions, its subsequent exposure to light initiates a photochemical process with an end product of chromium oxide, $Cr_2O_3$, that can react with the polar part of the gelatin molecule and can cause a cross-linking of the gelatin molecules because the photochemical process requires at most only a few dichromate ions in the adjacent gelatin molecules. The developed gelatin exhibits a very high spatial resolution and this resolution can be degraded in subsequent processing steps which provide an amplification of recorded information. As a result of the reduction of the chromium oxide, a small change in the index of refraction occurs so that a phase hologram can be recorded within the gelatin layer.

Referring to FIG. 1, the dichromatic gelatin plate is appropriately exposed to provide the desired image in step 2. For example, in a HUD it is highly desirable to provide a relatively lightweight aspheric reflection surface that is particularly advantageously formed with a hologram. Thus, the dichromatic gelatin can be placed on an appropriate substrate, such as a glass plate, and index matched with a mineral oil to a reference object such as a specially ground aspheric mirror. This recording module can then be appropriately exposed to the desired wavelength such as by a reflective hologram exposure procedure as known in the art. The dichromatic gelatin plate can then be cleansed of the index matching oil and the holographic interference pattern can be appropriately developed.

In step 4 the gelatin plate can be washed and hydrated in a deionized water bath and triethanolamine solution at a temperature of approximately 15° C. to 35° C. for a period of time of approximately 30 seconds to 10 minutes, e.g. a temperature of approximately 23° C for a period of time of 5 minutes has been found to be adequate. The triethanolamine solution comprises 4.5 grams triethanolamine per liter of water and has a pH of 10.0. During this step 4, the gelatin layer swells to approximately 2 to 3 times its original thickness.

Previously, the hydrated gelatin plate has been dehydrated by being immersed in a series of deionized water and isopropyl alcohol in a temperature range of approximately 150° C. to 35° C. for a period of about 5 minutes each. The first bath would constitute 75 percent water and 25 percent alcohol, a second bath would constitute 10 percent water and 90 percent alcohol, and the last two baths would comprise 100 percent isopropyl alcohol. The temperature of the baths and the duration of the immersion would remain relatively the same. This was the procedure utilized with developing HUD combiners. Four baths have been used but only one is really necessary if it is possible to remove the water from the bath fast enough. This could be done by pumping through very efficient dehydrators.

Other dehydration steps have relied upon a combination of alcohol at processing temperatures that approach the boiling point for the alcohol. Additionally, a large volume of alcohol, e.g. approximately 50 gallons in the HUD processing, is frequently utilized. During the processing, the alcohol has to be demoisturized or else replaced with new alcohol. The gelatin plates are highly sensitive to the amount of moisture and it is important, both in the prior technology and in the present invention, to insure a uniform dehydration rate by removing the water from the vicinity of the gelatin plate and insuring a constant percentage of alcohol is available for the dehydration process. The volatility and flammability of alcohol presents a production problem in the manufacture of holograms from dichromated gelatin and similar material.

The present invention has advantages over the standard processing dehydration procedure by enhancing uniformity, stability and reproducibility. The present invention also has been found to provide a slight increase in wavelength stability in the resulting holograms, the capacity to eliminate the steps of maintaining, testing and adjusting numerous baths of alcohol and water solutions, and finally, the fact that the present invention provides a better solvent for some contaminants and therefore, lessens the damage to the holograms from improper treatment.

The present invention generally is a replacement of the conventional dehydration processing steps with an improved dehydration step of providing an isopropyl alcohol, isopropanol or 2-propanol in an inert anhydrous liquid. The preferred inert liquid is a liquid fluorinated hydrocarbon solution such as Freon, which is commercially sold by the E. I. Dupont Company, the particular "Freon" we use is 1,1,2 -trichloro - 1,2,2 -trifluoroethane. One or more baths or sprays of the fluorinated hydrocarbon/alcohol mixture can be utilized in the dehydration step of step 6 of FIG. 1. A result of a test of the efficiency of the new dehydration step, proposed by the present invention, can be determined from the following table.

TABLE 1

|  | PROCESSING RESULTS FLUORINATED HYDROCARBON/ ALCOHOL DEHYDRATION | | | COMPARISON WITH 3 BATHS STANDARD DEHYDRATION WATER/2-PROPANOL |
| --- | --- | --- | --- | --- |
|  | 3:1 | 1:1 | 1:3 | (25%, 90%, 100%) |
| TRANSMISSION LOSS (EXPOSED AREA) | 10.7% | 11.1% | 10.7% | 11.9% |
| TRANSMISSION LOSS (UNEXPOSED AREA) | 10.7% | 11.0% | 10.4% | 11.2% |
| EFFICIENCY | 94.9% | 95.7% | 94.9% | 97.2% |
| WAVELENGTH | 556.7 nm | 557.2 nm | 557.9 nm | 550.5 nm |
| BANDWIDTH | 17.0 nm | 16.0 nm | 16.0 nm | 17.2 nm |

The above table represents an experiment wherein a fluorinated hydrocarbon/alcohol bath comprising different percentages of alcohol and fluorinated hydrocarbon was used to develop acommon dichromated gelatin substrate material with a similar exposure step. Three separate development procedures are compared with a conventional development of different ratios. The right-hand side of the column represents the standard processing measurements wherein a bath of 25 percent isopropyl alcohol and 75 percent deionized water was used for the first immersion, a second bath of 90 percent isopropyl alcohol and 10 percent deionized water was used for the second immersion, and finally a bath of 100 percent isopropyl alcohol was used for the final immersion. The immersions were for a constant time period and a constant temperature.

In the dehydration system of the present invention, 3 separate baths each of the identical mixture of fluorinated hydrocarbon and alcohol, e.g. ratios of 1:3, 1:1 and 3:1, were used and the hydrated gelatin plate was immersed for the same time period and for the same temperature for each of 3 successive baths, e.g. five minutes at 23° C. in each ratio of baths. It should be noted that a range of additional ratios for the mixture can be used, such as, for example, a ratio of 6:1 fluorinated hydrocarbon to alcohol, and that the ratios can vary from bath to bath. It is further contemplated that the final bath may be advantageously performed at a higher temperature such as at or near the boiling temperature of the mixture. At such elevated temperatures, the ratio of fluorinated hydrocarbon to alcohol can be made high.

Another improvement over the prior three-bath dehydration process is to still use alcohol in the initial baths but to add to the final alcohol bath a fluorinated hydrocarbon as mentioned above.

As can be seen the transmission loss at a wavelength frequency outside the effective interference pattern of the hologram, that is at 700 nanometers, disclosed a loss of approximately 10.7 percent for 3 parts fluorinated hydrocarbon to 1 part alcohol which included both scattering, absorption and reflection losses. Since the gelatin is mounted on a glass substrate, it can be appreciated that there is substantial losses (about 8%) associated with reflection from the glass air and glass gelatin interface alone. The second row represents the transmission loss in the unexposed area at 700 nanometers. The third row represents the efficiency or the ability of the developed hologram to reflect the design wavelength. The fourth row discloses the resulting peak wavelength and the fifth row discloses the bandwidth about that peak wavelength. As can be seen, the results between the present invention dehydration steps and that of the standard procedure are substantially close without experiencing the inherent safety problems associated with flammable alcohol.

Step 8 represents the stabilization of the gelatin plate which for example can be accomplished through a prolonged baking at a temperature such as 100° C. A hologram for a HUD combiner generally utilizes a baking period of 3 to 4 weeks to achieve the desired stability for the design wavelength.

Figure 2:
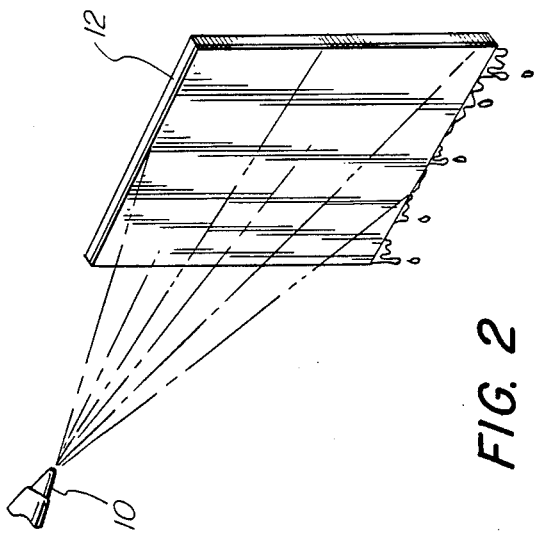
FIG. 2 is a schematic illustration of a spraying step.

Referring to FIG. 2, an alternative procedure for a dehydration process, step 6, is shown. A nozzle 10 is capable of spraying the fluorinated hydrocarbon/alcohol solution on a hydrated gelatin plate 12 to accomplish the dehydration of the present invention. This spraying procedure insures that a constant fresh supply of alcohol is applied to the gelatin surface and that extracted water is removed to insure a uniform dehydration.

Figure 3:
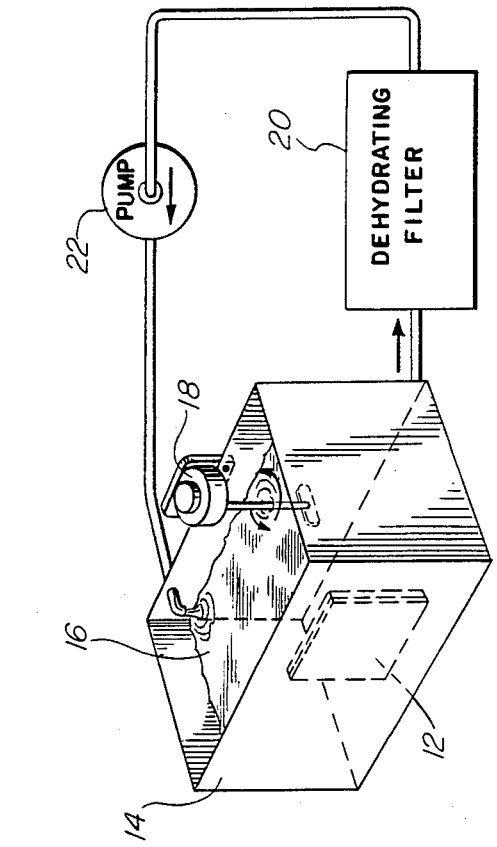
FIG. 3 is a schematic illustration of an immersion step.

FIG. 3 discloses another alternative procedure in dehydration step 6 wherein a tank 14 can hold the alcohol/fluorinated hydrocarbon solution 16 and the hydrated gelatin plate 12 is completely immersed in the solution. A stirrer apparatus 18 can insure that sufficient agitation is caused to increase the uniform dehydration rate from the gelatin. To insure that the bath solution is kept dry, since it will be picking up moisture from the dehydrating gelatin plate, the solution can be passed over a dehydrating filter system 20 such as a molecular sieve dehydrating bed (not shown) and then returned by a pump 22 to the tank 14. Dehydrating filter systems such as a desicant filter of molecular sieves are commercially known. The fluorinated hydrocarbon to alcohol ratio is not as critical as the water/alcohol ratio in the standard baths. As a result, reproducibility is thus improved in the production line. As can also be appreciated, the ability to use spray processing as shown in FIG. 2 is an advantage with particularly large holograms because previously safety became a substantial problem in spraying with a flammable liquid.

In conclusion, the inventors have provided an improved method of dehydrating hydrated hologram gelatin in the process of manufacturing holographically recorded interference patterns in a dichromated gelatin or similar substance. As can be readily appreciated by a person of ordinary skill in this field, changes in the process parameters can be made to adjust for the thickness of the gelatin layer, the particular gelatin utilized, and the variations between temperature and time as would be normally expected by a person of ordinary skill in the field while still practicing within the generic principles of the present invention. Accordingly the scope of the present invention should be measured solely from the following claims.

What is claimed is:

1. In a method of developing a holographically recorded interference pattern in a dichromated gelatin that has been initially subjected to a hydration bath and will be subsequently stabilized, the improvement of dehydration, comprising:
   contacting the hydrated gelatin with a mixture of alcohol and a liquid fluorinated hydrocarbon solution to dehydrate the dichromated gelatin.

2. The method of claim 1 wherein the mixture of alcohol and liquid fluorinated hydrocarbon solution is sprayed on the hydrated gelatin.

3. The method of claim 1 wherein the hydrated gelatin is immersed in a mixture of alcohol and liquid fluorinated hydrocarbon.

4. The method of claim 1 further including the step of drying the mixture of alcohol and liquid fluorinated hydrocarbon.

5. The method of claim 1 further including agitation of the mixture of alcohol and liquid fluorinated Hydrocarbon.

6. The method of claim 1 wherein the ratio of fluorinated hydrocarbon to alcohol is within the range of about 6:1 to about 1:3.

7. In a method of manufacturing optical elements from holographically recorded interference patterns in a dichromated gelatin comprising, the steps of:
   developing the hologram pattern by hydration;
   dehydrating the hydrated hologram gelatin by contacting the hydrated gelatin with a mixture of alcohol and a liquid fluorinated hydrocarbon solution, and
   stabilizing the dehydrated hologram pattern in the gelatin by baking.

8. The method of claim 7 wherein the dehydration is accomplished by spraying the alcohol and liquid fluorinated hydrocarbon solution on the hydrated gelatin.

9. The method of claim 7 wherein the dehydration is accomplished by immersion of the hydrated gelatin.

10. The method of claim 7 wherein the ratio of fluorinated hydrocarbon to alcohol is within the range of about 6:1 to about 1:3.

11. In a method of developing a holographically recorded interference pattern in a dichromated gelatin that has been initially subjected to a hydration bath and will be subsequently stabilized, the improvement of dehydration, comprising:

contacting the hydrated gelatin with a mixture of alcohol and an inert anhydrous liquid solution to dehydrate the dichromated gelatin.

12. The method of claim 11 wherein the mixture of alcohol and the inert anhydrous solution is sprayed on the hydrated gelatin.

13. The method of claim 11 wherein the hydrated gelatin is immersed in a mixture of alcohol and the inert anhydrous solution.

14. The method of claim 11 further including the step of drying the mixture of alcohol and the inert anhydrous solution.

15. The method of claim 11 wherein the inert anhydrous liquid is fluorinated hydrocarbon and the ratio of fluorinated hydrocarbon to alcohol is, within the range of about 6:1 to about 1:3.

16. In a method of developing a recorded pattern in a dichromated gelatin that has been initially subjected to a hydration bath and will be subsequently stabilized, the improvement of dehydration, comprising:

contacting the hydrated gelatin with a plurality of baths which include alcohol and, at least the last one of the baths includes a liquid fluorinated hydrocarbon all in a solution to dehydrate the dichromated gelatin.

17. The method of claim 16 wherein all of the plurality of baths include a mixture of alcohol and liquid fluorinated hydrocarbon.

18. The method of claim 16 wherein the ratio of fluorinated hydrocarbon to alcohol is within the range of about 6:1 to about 1:3.

19. The method of claim 16 wherein the last one of the baths is at or about the boiling temperature of the solution.

* * * * *